(12) United States Patent
Worley et al.

(10) Patent No.: US 8,514,532 B2
(45) Date of Patent: Aug. 20, 2013

(54) ELECTROSTATIC DISCHARGE PROTECTION CIRCUIT

(75) Inventors: Eugene R. Worley, Irvine, CA (US); Chiew-Guan Tan, San Diego, CA (US); Mark R. Tennyson, Irvine, CA (US)

(73) Assignee: Conexant Systems, Inc., Irvine, CA (US)

( * ) Notice: Subject to any disclaimer, the term of this patent is extended or adjusted under 35 U.S.C. 154(b) by 554 days.

(21) Appl. No.: 12/487,528

(22) Filed: Jun. 18, 2009

(65) Prior Publication Data

US 2010/0321841 A1 Dec. 23, 2010

(51) Int. Cl.
- *H02H 9/00* (2006.01)
- *H02H 3/20* (2006.01)
- *H02H 9/04* (2006.01)
- *H02H 3/22* (2006.01)

(52) U.S. Cl.
USPC ............................. 361/56; 361/91.1; 361/111

(58) Field of Classification Search
USPC .......................................... 361/56, 91.1, 111
See application file for complete search history.

(56) References Cited

U.S. PATENT DOCUMENTS

| | | | |
|---|---|---|---|
| 6,552,886 B1 * | 4/2003 | Wu et al. | 361/56 |
| 6,917,207 B1 | 7/2005 | Blumenthal | |
| 7,102,862 B1 * | 9/2006 | Lien et al. | 361/56 |
| 7,570,468 B2 | 8/2009 | Bernard et al. | |
| 2003/0102813 A1 | 6/2003 | Humphrey et al. | |
| 2004/0125521 A1 | 7/2004 | Salling et al. | |
| 2005/0068702 A1 | 3/2005 | Connor et al. | |
| 2005/0128665 A1 | 6/2005 | Roohparvar | |
| 2005/0162791 A1 | 7/2005 | Ahmad et al. | |
| 2005/0275989 A1 | 12/2005 | Chen | |
| 2006/0170054 A1 * | 8/2006 | Mergens et al. | 257/355 |
| 2007/0053120 A1 | 3/2007 | Gauthier, Jr. et al. | |
| 2008/0007882 A1 * | 1/2008 | Bernard et al. | 361/56 |
| 2009/0201615 A1 | 8/2009 | Bernard et al. | |
| 2010/0149701 A1 * | 6/2010 | Drapkin et al. | 361/56 |

OTHER PUBLICATIONS

Weinlein, John et al., Electrostatic Discharge (ESD) Protection for a Laser Diode Ignited Actuator, Sandia Report, SAND2003-2100, Prepared by Sandia National Laboratories, Albuquerque, New Mexico 87185 and Livermore, California 94550, Printed Jun. 2003, 17 pgs.

* cited by examiner

*Primary Examiner* — Rexford Barnie
*Assistant Examiner* — Christopher Clark
(74) *Attorney, Agent, or Firm* — John R. Thompson; Stoel Rives LLP

(57) ABSTRACT

Disclosed herein are embodiments of electrostatic discharge (ESD) protection circuits. In certain embodiments an ESD protection circuit may include two series resistor-capacitor (RC) circuits. One series RC circuit may have a short time constant and may selectively activate a current shunt between two power rails in response to an ESD event. Accordingly, the ESD circuit may be able to respond to fast ramping ESD events. The other series RC circuit has a longer time constant, and maintains the current shunt in an active state for a sufficient amount of time to allow the ESD event to be completely discharged.

31 Claims, 11 Drawing Sheets

Voltage at Power Rail 106a

Voltage at Node 108a

Voltage at Node 109a

Current at Power Rail 106a

Time

Voltage at Power Rail 106a

Voltage at Node 108a

Voltage at Node 109a

Current at Power Rail 106a

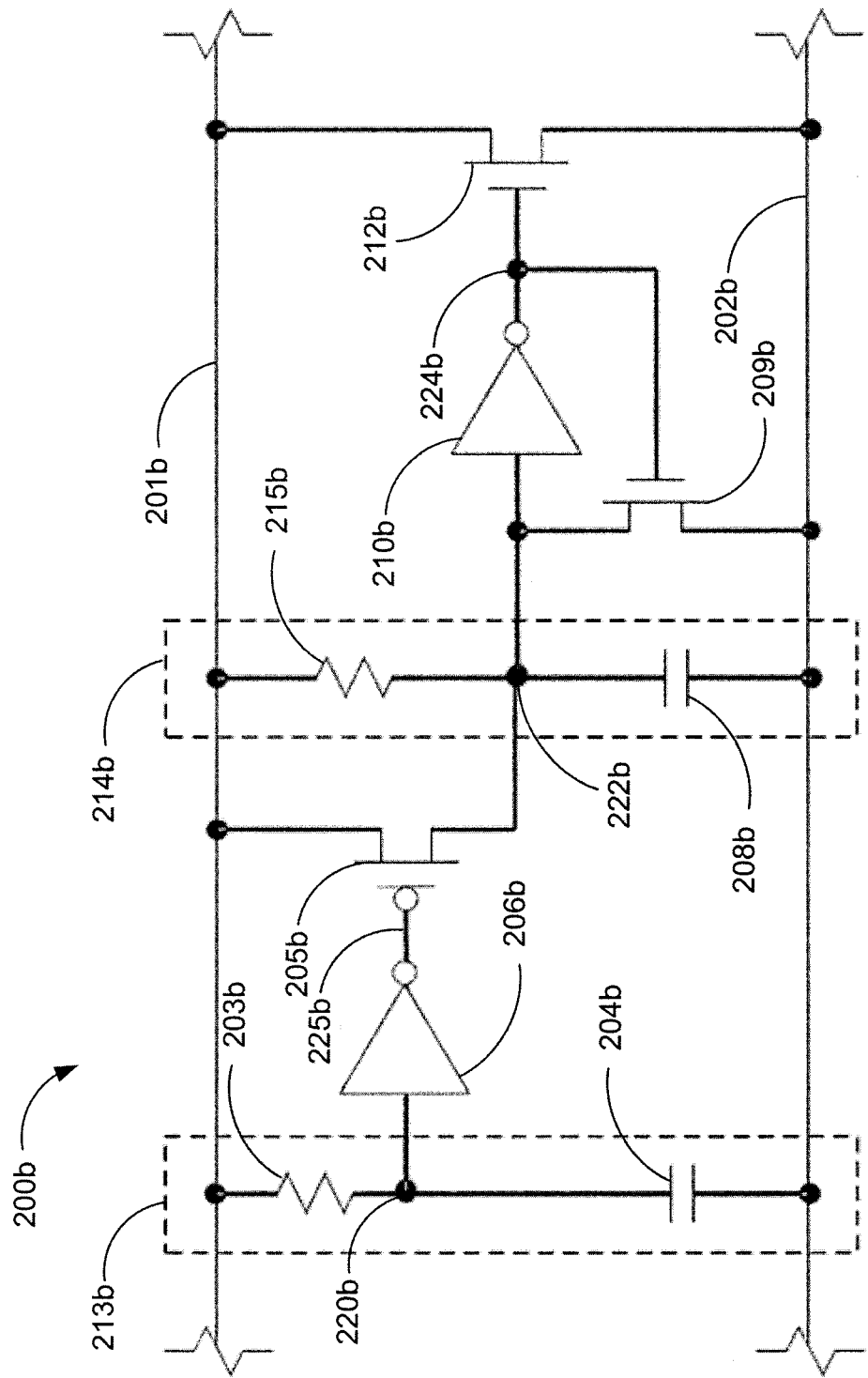

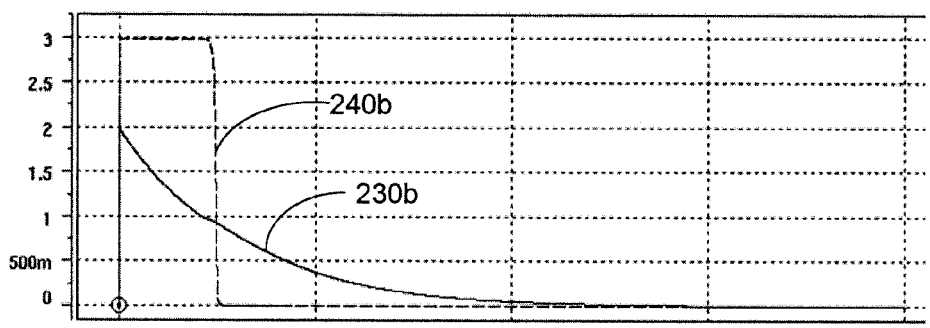
FIG. 2D 3V, 50ps Ramp Voltage
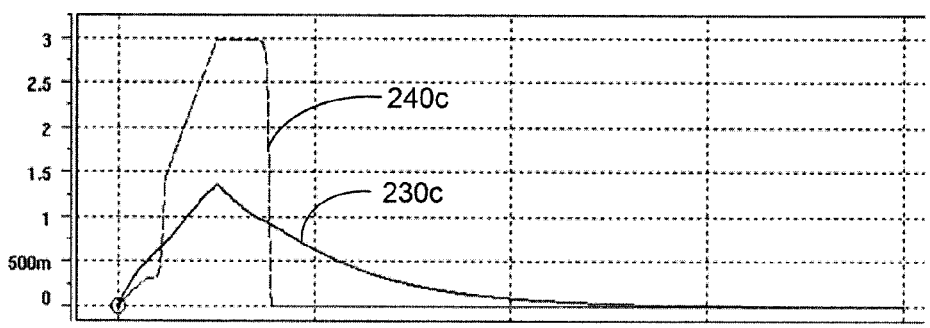
FIG. 2E 3V, 50ns Ramp Voltage
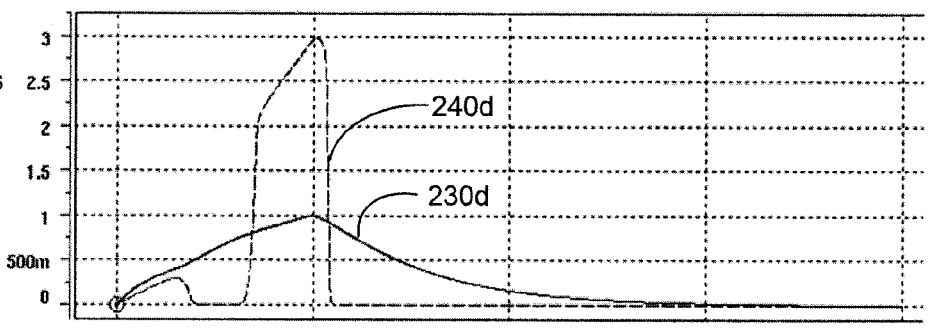
FIG. 2F 3V, 100ns Ramp Voltage
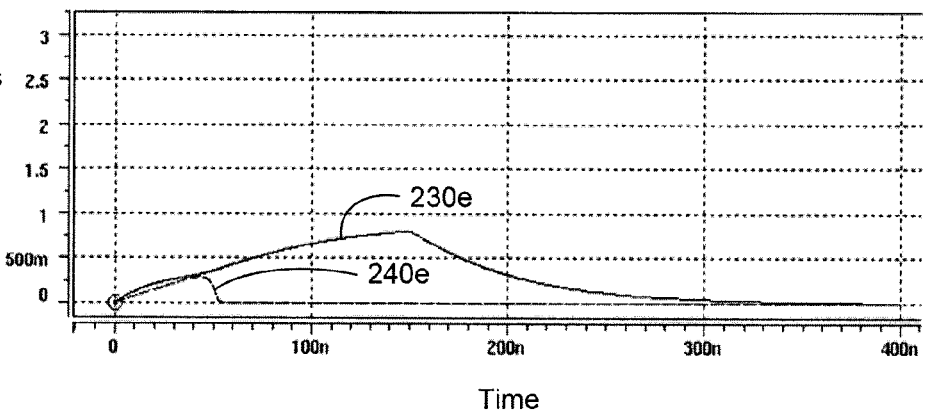
FIG. 2G 3V, 150ns Ramp Voltage
Time Voltage at Power Rail 201a Voltage at Node 222a Voltage at Node 224a Voltage at Node 220a Voltage at Node 225a Current at Power Rail 201a Time Voltage at Power Rail 201a Voltage at Node 222a Voltage at Node 224a Voltage at Node 220a Voltage at Node 225a Current at Power Rail 201a Time

ELECTROSTATIC DISCHARGE PROTECTION CIRCUIT

TECHNICAL FIELD

The present disclosure relates to electrostatic discharge protection circuits.

BRIEF DESCRIPTION OF THE DRAWINGS

The various aspects and advantages are described by way of example in the following description of several embodiments and attached drawings. It should be understood that the accompanying drawings depict only typical embodiments and, as such, should not be considered to limit the scope of the claims. The embodiments will be described and explained with specificity and detail in reference to the accompanying drawings in which:

FIGS. 2B and 2C illustrate alternate embodiments of an ESD protection circuit having two RC circuits.

FIGS. 2D, 2E, 2F, and 2G illustrate the effect of a ramping power source on the power rail at node 222a of FIG. 2A and at node 224a of FIG. 2A.

DETAILED DESCRIPTION OF PREFERRED EMBODIMENTS

Figure 1A:
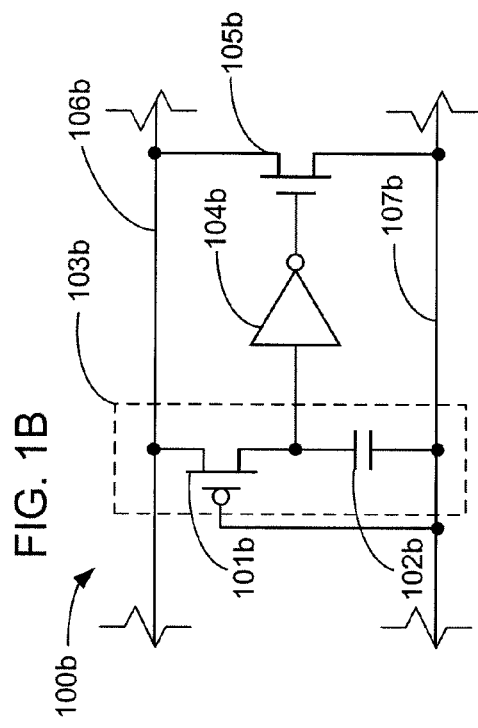
FIG. 1A illustrates an embodiment of an ESD protection circuit having a single series RC circuit.
Figure 1B:
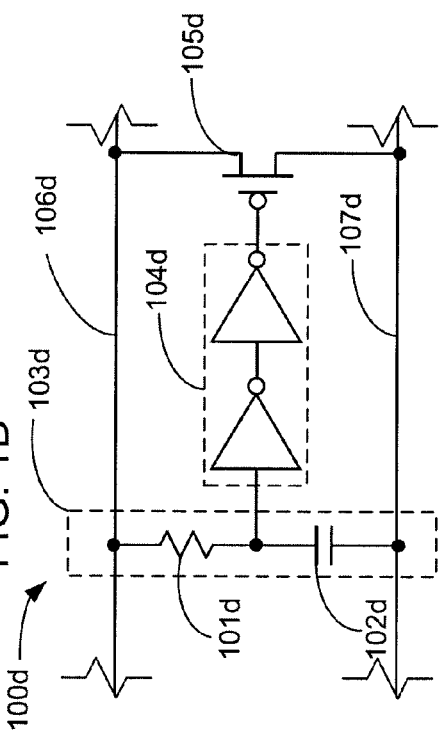
FIG. 1B illustrates an embodiment of an ESD protection circuit having a single RC circuit, in which the resistor is implemented using a PMOS transistor.

An electrostatic discharge (ESD) is transient current that flows between two objects at different electrical potentials. Electronic equipment, particularly integrated circuits and other solid state electronics, may be damaged by an ESD event. An ESD event causes a large current through a device for a short period of time. An ESD is a fast ramping current flow because there is typically little electrical resistance in its path. A typical ESD event may have voltages on the order of a few thousand volts.

An ESD protection circuit may employ a current shunt coupled between two power supply rails that may be selectively activated in order to mitigate the effect of an ESD event. A transistor may serve as the current shunt. The transistor gate may be driven with a buffer, which may in turn be driven by a series resistor-capacitor (RC) circuit having a time constant. The time constant of the series RC circuit is determined by the values of the resistor and capacitor in the RC circuit. A single series RC time constant may be sufficient in certain applications to provide protection in an ESD event; however, a single RC time constant circuit may respond to a fast-ramping power supply in the same manner as it would in response to an ESD event. In such cases, power from the power supply may be shunted between the power supply rails. A device may experience a high current during this period, which may pose a reliability concern or disrupt the system startup. For low power applications, the concern about high current flow is enhanced.

A series RC circuit acts as a filter. If an output is taken across the capacitor, high frequencies are attenuated and low frequencies are passed. If the output is taken across the resistor, high frequencies are passed and low frequencies are attenuated. Using this property, a series RC circuit in an appropriate configuration may be used to detect an ESD event. The node between the resistor and capacitor may be connected to a current shunt. The voltage at the node between the resistor and capacitor may approximately track the increasing voltage caused by a fast ramping ESD event, and may cause the current shunt to enter an active mode, in which current is shunted between the power rails.

In certain embodiments according to the present disclosure, dual series RC circuits are used. One series RC circuit may have a short time constant and may selectively activate a current shunt between the power rails. Accordingly, the ESD circuit may be able to respond to fast ramping ESD events. The other series RC circuit may have a longer time constant, and may maintain the current shunt in an active mode for a sufficient amount of time to allow the ESD event to be completely discharged.

As used herein, the term active mode refers to a state of a transistor where the voltage of the gate with respect to the source is higher than a threshold voltage. In the active mode, the transistor may be compared to a closed switch, or a logical "on." The term cutoff mode refers to a state of a transistor where the voltage of the gate with respect to the source is lower than a threshold voltage. In the cutoff mode, current flow through the transistor is minimal, and the state may be compared to an open switch, or a logical "off." The term steady-state refers to a circuit in an equilibrium condition that occurs when the effects of transient signals in the circuit are insignificant.

Reference throughout this specification to "one embodiment" or "an embodiment" means that a particular feature, structure, or characteristic described in connection with the embodiment is included in at least one embodiment. Thus, the appearance of the phrases "in one embodiment" or "in an embodiment" in various places throughout this specification are not necessarily all referring to the same embodiment. In particular, an "embodiment" may be a system, an article of manufacture (such as a computer readable storage medium), a method, and a product of a process.

The phrases "coupled to," "connected to," and "in communication with" refer to any form of interaction between two or more entities, including mechanical, electrical, magnetic, and electromagnetic interaction. Two components may be connected to each other even though they are not in direct contact with each other and even though there may be intermediary devices between the two components.

Furthermore, the described features, structures, or characteristics may be combined in any suitable manner in one or more embodiments. Those skilled in the art will recognize that the teachings of the present disclosure can be practiced without one or more of the specific details, or with other methods, components, materials, etc. In other instances, well-known structures, materials, or operations are not shown or are not described in detail to avoid obscuring aspects of the present disclosure.

Figure 1C:
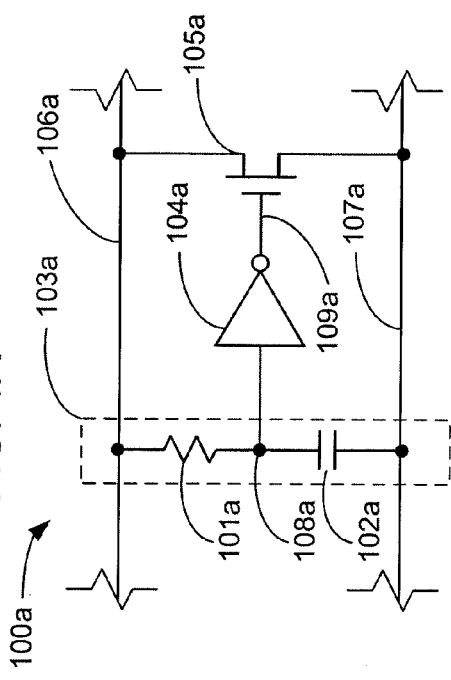
FIG. 1C illustrates an embodiment of an ESD protection circuit having a single RC circuit, in which the capacitor is implemented using an NMOS transistor.

With reference to the accompanying drawings, FIGS. 1A, 1B, 1C, 1D, 1E, 1F, and 1G illustrate various embodiments of an ESD protection circuit 100 having a single series RC circuit 103, with an associated RC time constant. The RC time constant of series RC circuit 103a, for example, is equal to the product of the resistance of resistor 101a (in ohms) and the capacitance of capacitor 102a (in farads). Resistor 101 may be embodied as a variety of devices that exhibit resistance to the flow of electrical current. As illustrated in comparing FIG. 1A to FIG. 1B, a PMOS transistor 101b may be the functional equivalent of resistor 101a. Similarly, FIGS. 1A and 1C illustrate that capacitor 102a may be implemented in different ways. For example, capacitor 102c may be implemented using an NMOS or MOSCAP transistor.

Figure 1D:
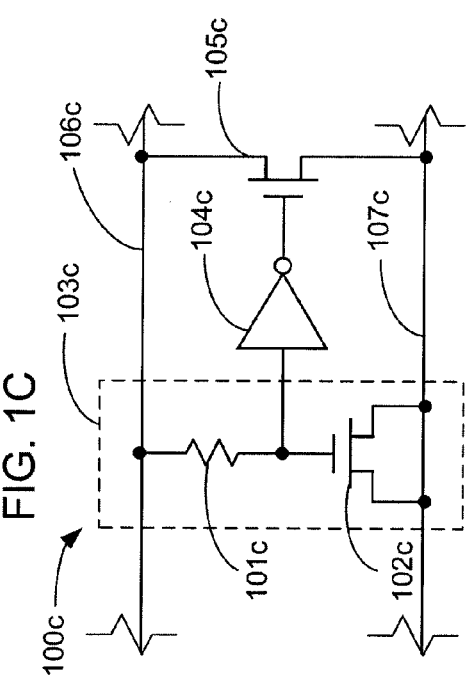
FIG. 1D illustrates an embodiment of an ESD protection circuit having a single RC circuit, incorporating two inverters and a PMOS transistor.
Figure 1F:
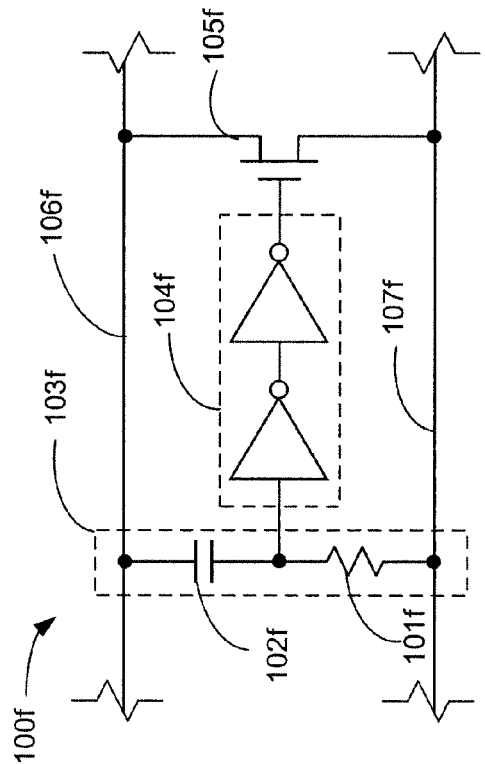
FIG. 1F illustrates an embodiment of an ESD protection circuit having a single RC circuit, in which the RC circuit is inverted in comparison to FIG. 1A, and which incorporates a non-inverting buffer consisting of two inverter stages.
Figure 1E:
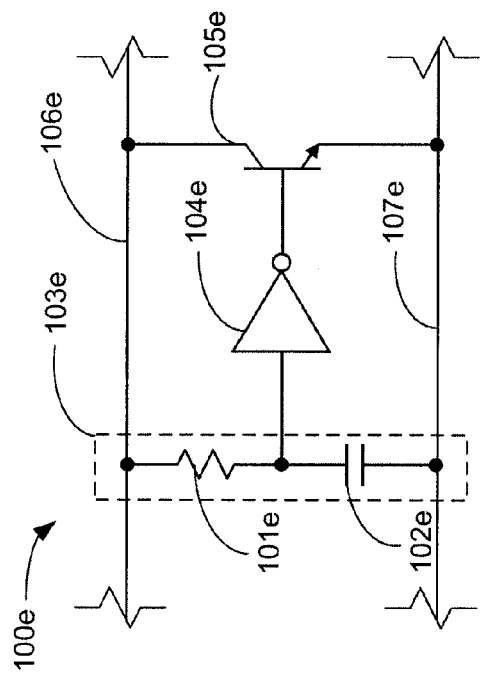
FIG. 1E illustrates an embodiment of an ESD protection circuit having a single RC circuit and incorporating an NPN transistor.
Figure 1G:
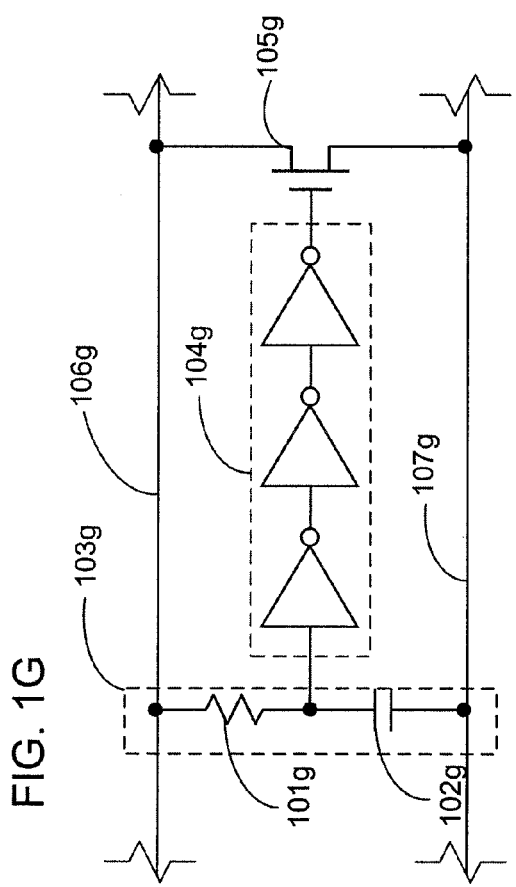
FIG. 1G illustrates an embodiment of an ESD protection circuit having a single RC circuit and which incorporates a buffer consisting of three stages.

RC circuit 103 may be used to drive a buffer 104, which may in turn be connected to the gate of a transistor 105 coupled between two power rails 106, 107. As illustrated in FIG. 1D, a buffer 104d may comprise two inverters in series, which may drive the gate of a PMOS transistor 105d. PMOS transistor 105d may exhibit a higher resistance per unit width, than a comparable NMOS transistor, but it may be more immune to bipolar snapback. As illustrated in FIG. 1E, an NPN transistor 105e may also be used. FIG. 1F shows that the positions of capacitor 102f and resistor 101f may be inverted when compared to FIG. 1A, and a non-inverting buffer 104f comprising two inverters in series may be used to drive the gate of transistor 105f. As illustrated in FIG. 1G, a buffer 104g may comprise three inverters in series. In various embodiments, amplifiers may be used in place of inverters, and PMOS transistors may be used in place of NMOS transistors. As used herein, the term buffer may refer to one or more inverters or amplifiers.

The embodiments illustrated in FIGS. 1A-1G have a current shunt (i.e., transistor 105) that may be put into an active mode by a rapid transition (i.e., an ESD event) on power rail 106. In the active mode, transistor 105 acts as a current shunt between power rail 106 and power rail 107. Transistor 105 may be embodied in a variety of forms, including as a BIGFET transistor.

All of the embodiments illustrated in FIG. 1 keep transistor 105 in the active mode for a period of time (i.e., the time for charge to accumulate on the capacitor 102) after the rapid transition. RC circuit 103 allows transistor 105 to remain in the cutoff mode when the transition on power supply rail 106 is long relative to the time constant of RC circuit 103; however, the embodiments illustrated in FIGS. 1A-1G may also allow transistor 105 to enter the active mode in response to any transition that is short relative to the time constant of RC circuit 103. In selecting the time constant of RC circuit 103, the values of resistor 101 and capacitor 102 should be chosen so as to activate transistor 105 in response to an ESD event, but not in response to a ramping power supply.

Figure 1H:
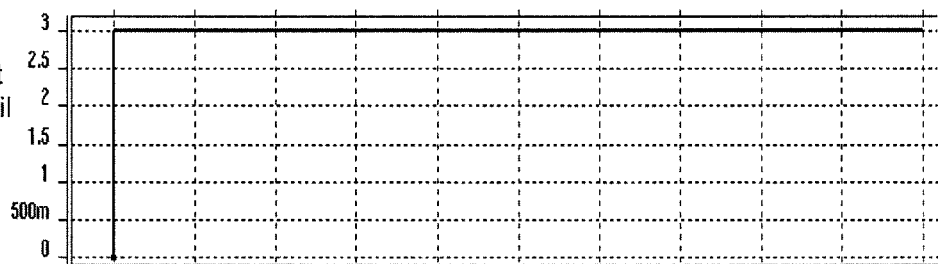
FIGS. 1H, 1I, 1J, and 1K illustrate the response of the ESD protection circuit of FIG. 1A in response to a power supply ramping to three volts in 50 ps.
Figure 1I:
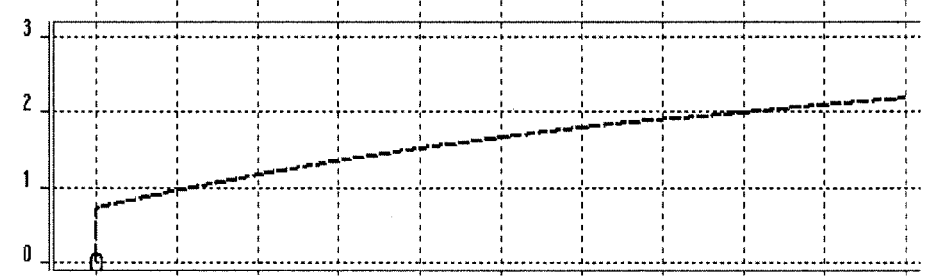
Figure 1J:
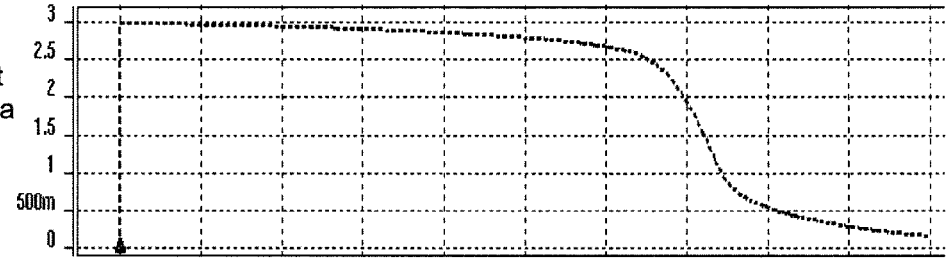
Figure 1K:
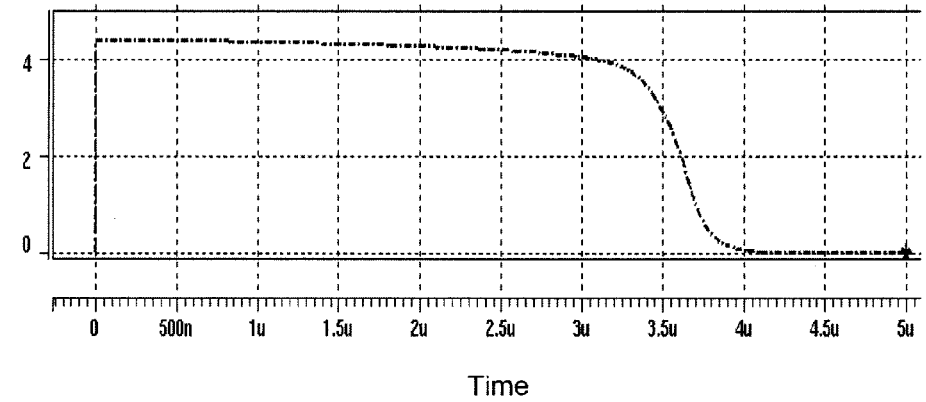
Figure 1L:
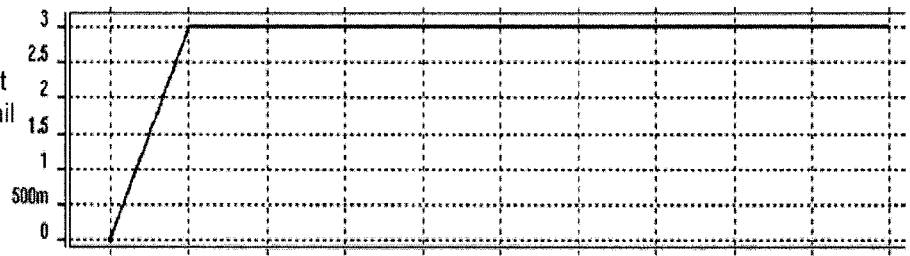
FIGS. 1L, 1M, 1N, and 1O illustrate the response of the ESD protection circuit of FIG. 1A in response to a power supply ramping to three volts in 500 ns.
Figure 1M:
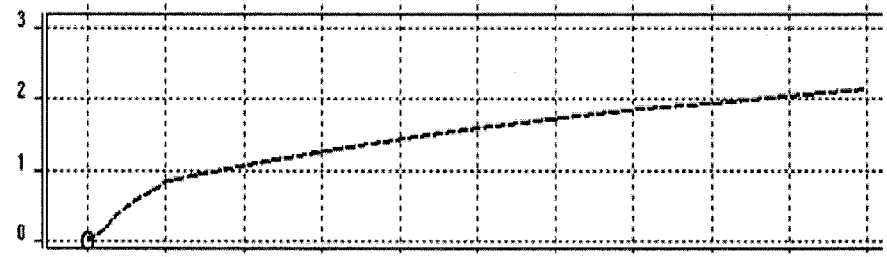
Figure 1N:
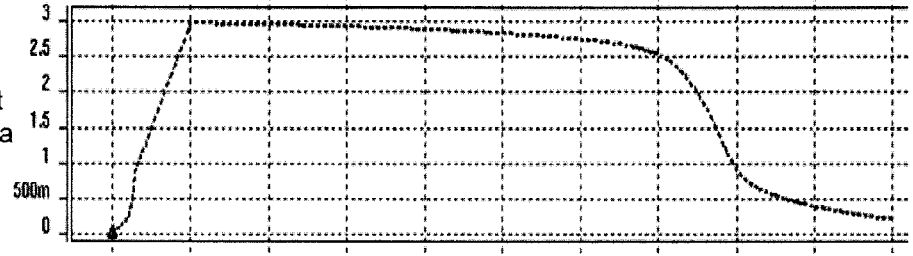
Figure 1O:
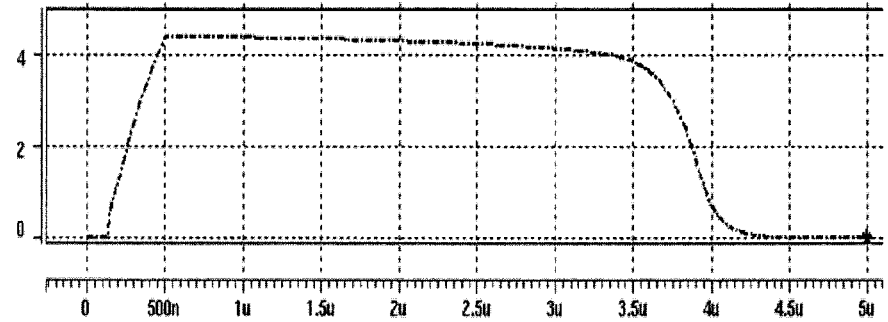

FIGS. 1H-1K illustrate the response of ESD protection circuit 100a to a power supply that ramps to three volts in 50 ps. FIG. 1H illustrates the voltage at power rail 106a as a function of time. Between time equal to zero and 50 picoseconds, the voltage at power rail 106a ramps up to three volts. FIG. 1I shows that in response to the increased voltage at power rail 106a, the voltage at node 108a initially steps up because of parasitic capacitance of inverter 104a. Capacitor 102a is sized such that it maintains a low voltage at node 108a relative to the voltage at power rail 106a. FIG. 1J illustrates that the initially low voltage at node 108a causes a high voltage at node 109a, and accordingly, transistor 105a is in active mode. As a result of transistor 105a being in active mode, a large current is shunted between the current rails 106a, 107a. As illustrated in FIG. 1I, after the initial step, the voltage at node 108a climbs slowly, thus maintaining a low voltage at node 109a for sufficient time to shunt the ESD current through transistor 105a for the duration of the ESD event. FIG. 1K illustrates a large current flowing through power rail 106a. As time passes, the voltage at node 108a increases, the voltage at node 109a begins to decrease, and transistor 105a is placed into cutoff mode. In cutoff mode, the current through power rail 106a shown in FIG. 1K decreases.

FIGS. 1L-1O illustrate the response of the ESD protection circuit 100a to a power supply that ramps to three volts in 500 ns. In comparing FIG. 1J to FIG. 1N, the voltage at node 109a increases more slowly, and accordingly, the current at power rail 106a, shown in FIG. 1O, increases more slowly. FIGS. 1L-1O illustrate that the ESD protection circuit 100a was activated in response to a fast ramping power supply, which may have a ramp time on the order of the ramp time shown in FIG. 1L.

Activating an ESD protection circuit may be of particular concern in a hot plug system. In a hot plug system, a power supply is already powered up (i.e. the power source is "hot") when a device is connected. A typical power supply exhibits a significant amount of capacitance from holding capacitors, filter capacitors, and bypass capacitors within the power supply. When a hot plug device is connected, this capacitance may lead to a large current discharge. Various computer interfaces, including Universal Serial Bus (USB) IEEE 1394, SATA, eSATA, and the like, support hot plug devices. The ramp time of a hot plug device may be on the order of a few hundred nanoseconds. In contrast, the ramp time of a "cold" power supply is typically on the order of a few tens of milliseconds.

In the embodiments of ESD protection circuits 100 illustrated in FIGS. 1A-1G, a tradeoff occurs between being able to detect a fast ramping signal and being able to maintain transistor 105 in the active mode for a sufficient amount of time to allow the charge from an ESD event to be completely dissipated. On one hand, it is desirable to have a fast time constant so as to detect fast ramping ESD events; while on the other hand, the time constant must be sufficiently long to allow the charge from the ESD event to be completely dissipated. It may not be possible to satisfy both considerations in an ESD protection circuit having a single RC circuit. Accordingly, a fast ramping power supply may lead to activation of an ESD protection circuit, which may cause a current surge in a device.

Figure 2A:
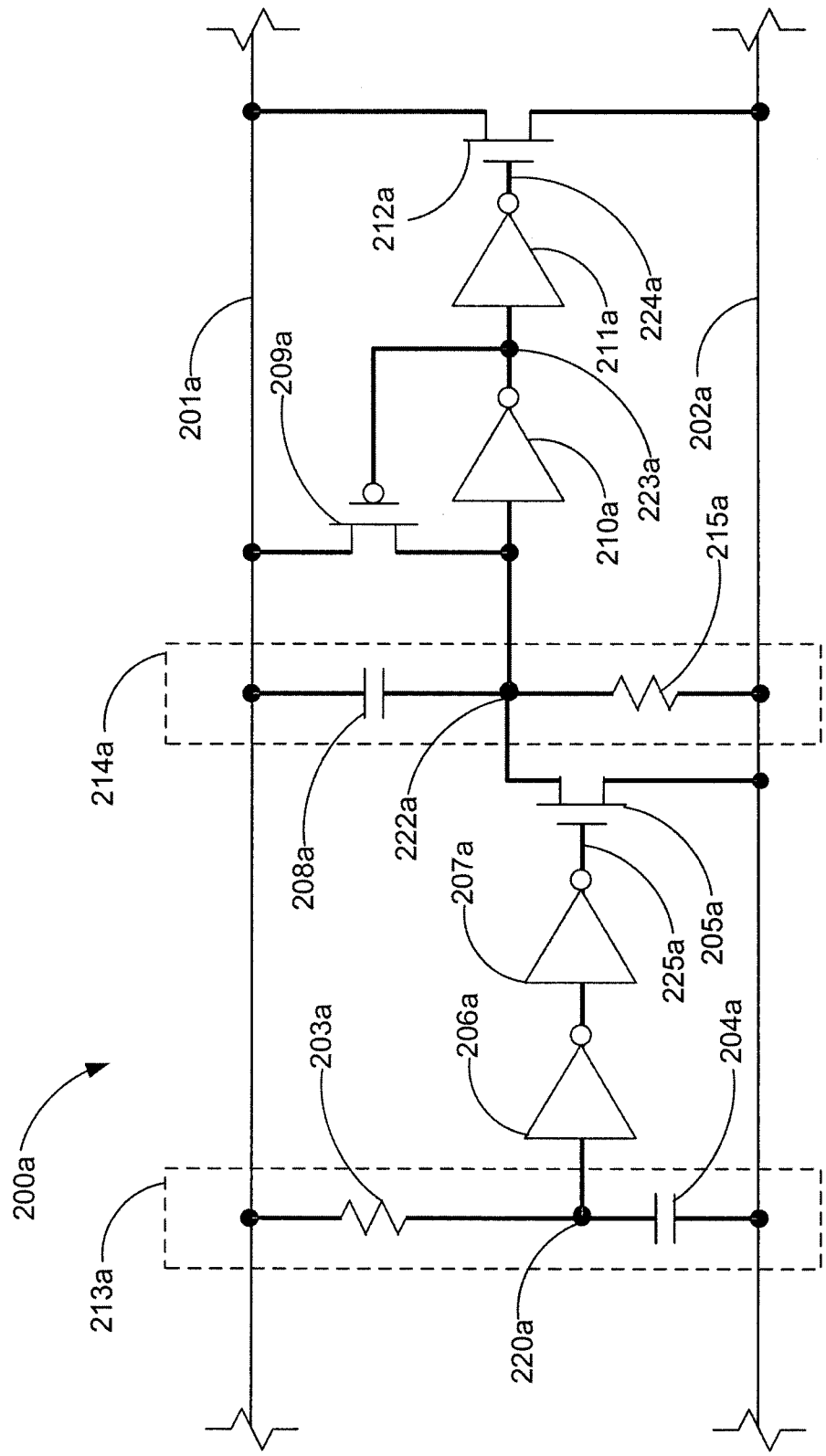
FIG. 2A illustrates an embodiment of an ESD protection circuit having two RC circuits.

FIG. 2A illustrates an ESD protection circuit 200a including two RC circuits 213a, 214a. The time constant of RC circuit 214a may be faster than the time constant of RC circuit 213a. Although not shown, inverters 206a, 207a, 210a, 211a may be connected to the power supply rails 201a, 202a. The voltage of power supply rail 201a may exceed the voltage of power supply rail 202a. When the input voltage of an inverter exceeds a reference voltage (e.g., the input is high), the output may be driven to a low voltage (e.g., the voltage of power supply rail 202a). When the input voltage is less than the specified voltage (e.g., the input is low), the output is driven to a high voltage (e.g., the voltage of power supply rail 201a).

When power is initially applied to ESD protection circuit 200a, the voltage across capacitors 208a and 204a cannot change instantaneously. A fast ramping signal on power supply rail 201a (i.e., an ESD event) causes the voltage at node 222a to be above the threshold voltage of inverter 210a, which causes transistors 212a and 209a to enter the active mode. In contrast, a slower ramping power supply connected to power supply rail 201a may allow charge to accumulate on capacitor 208a, such that the voltage at node 222a does not exceed the threshold voltage of inverter 210a. In such a case, the power supply may ramp up without causing transistor 212a to enter the active mode. The time constant of RC circuit 214a determines the conditions under which transistor 212a enters the active mode. A faster time constant of RC circuit 214a will allow a faster ramping power source without causing transistor 212a to enter the active mode. Once transistor 212a enters the active mode, it will remain in the active mode until sufficient charge accumulates on capacitor 204a to cause the voltage at node 220a to exceed the threshold voltage of inverter 206a.

When power is initially applied to ESD protection circuit 200a, the voltage at node 220a is low, and will remain low while charge accumulates on capacitor 204a. After an amount of time determined by the time constant of RC circuit 213a, the voltage at node 220a reaches the threshold voltage of inverters 206a, 207a, and transistor 205a enters the active mode. Transistor 205a may be sized so that its current in the active mode is larger than the current through transistor 209a in the active mode. With transistor 205a in active mode, the voltage at node 222a becomes low, and transistors 209a and 212a enter the cutoff mode. Accordingly, the time constant of RC circuit 213a determines the amount of time that transistors 212a and 209a remain in the active mode.

The time constants of RC circuits 213a, 214a allow ESD protection circuit 200a both to respond quickly to a fast ramping ESD event, and to keep transistor 212a in the active mode for some period of time, thus allowing the ESD event to be completely discharged. RC circuit 214a has a time constant that is faster than the time constant of RC circuit 213a. Transistor 212a is activated based on the time constant of RC circuit 214a. Accordingly, RC circuit 214a allows the circuit 200a to respond quickly to a fast ramping ESD event. RC circuit 213a has a slower time constant, and accordingly acts to keep transistor 212a in the active mode for some discharge period that is sufficient to allow the ESD event to be completely discharged.

ESD protection circuit 200a may also provide ESD protection in a steady state condition (e.g., when the power supply has been active for a sufficient length of time to allow transient signals associated with ramping up the power supply diminish). In a steady-state condition, capacitor 204a will be charged up to approximately the voltage difference between the power rails 201a, 202a. Accordingly little or no current will flow through resistor 203a. The input to inverter 206a will be high (i.e., approximately the voltage difference between the power rails 201a, 202a), and the output of the inverter 206a will be low (i.e., approximately equal to the voltage of power rail 202a). The input of inverter 207a will be low, and accordingly the voltage at the gate of transistor 205a will be high. The high voltage at the gate of transistor 205a will cause transistor 205a to be in the active mode. Accordingly, the voltage at node 222a will be low, and inverter 210a will have a high output voltage at node 223a. The high output voltage at node 223a causes transistor 209a to be in the cutoff mode. Inverter 211a, having a high input voltage at node 223a, produces a low output voltage at the gate of transistor 212a. Accordingly, transistor 212a is in the cutoff mode.

When an ESD event occurs, the voltage difference between the power rails 201a, 202a rapidly increases from the steady-state condition. The voltage across capacitors 204a and 208a cannot change instantaneously. Accordingly, current begins to flow through resistor 203a, causing the voltage at node 220a to be low (relative to the large voltage difference between the power rails 201a, 202a). A low voltage at node 220a causes a low voltage at the gate of transistor 205a, and thus transistor 205a will be in the cutoff mode. Current flowing through resistor 215a causes a high voltage at node 222a. The high input voltage to inverter 210a results in a low output at node 223a. Accordingly, transistor 209a is turned on. With transistor 209a in the active mode, the voltage at node 222a remains approximately equal to the voltage of power rail 201a. In other words, transistor 209a maintains transistor 212a in the active mode by preventing RC circuit 214a from discharging. Transistor 209a may be sized such that the current through transistor 209a is larger than the current through resistor 215a, and accordingly the voltage at node 222a is kept above the threshold voltage of inverter 210a. The low voltage at node 223a causes a high voltage at the gate of transistor 212a, and thus causes transistor 212a to be in the active mode. In the active mode, transistor 212a shunts current between the power rails 201a, 202a.

The ESD protection circuit 200a illustrated in FIG. 2A may be configured such that transistor 212a responds to fast ramping ESD events. A fast response to an ESD event is facilitated by having only a single gate capacitance, namely the gate capacitance of transistor 212a, that must be charged before transistor 212a enters the active mode. Charging additional capacitances may result in slower turn on of transistor 212a in response to an ESD event. As described above, it is not required that capacitor 208a be charged in order for transistor 212a to enter the active mode. In contrast, a parallel RC circuit in place of series RC circuit 214a would require that the capacitor be in parallel with the gate capacitance, and thus both capacitances would be charged simultaneously. Such a configuration would delay transistor 212a from entering the active mode in response to an ESD event.

FIG. 2B illustrates an alternate embodiment of an ESD protection circuit 200b including two RC circuits 213b, 214b. In FIG. 2B, a single inverter 206b is used in conjunction with a PMOS transistor 205b connected to power rail 201b. In contrast in FIG. 2A, an inverting buffer consisting of inverters 206a, 207a and an NMOS transistor connected to power rail 202a are used. Further, in FIG. 2B, a PMOS transistor 209b is used in connection with a single inverter 210b, while in FIG. 2A an NMOS transistor 209a is used in conjunction with two inverters 210a, 211a. Finally, the position of resistor 215b and capacitor 208b are reversed in FIG. 2B with respect to resistor 215a and capacitor 208a in FIG. 2A.

Figure 2C:
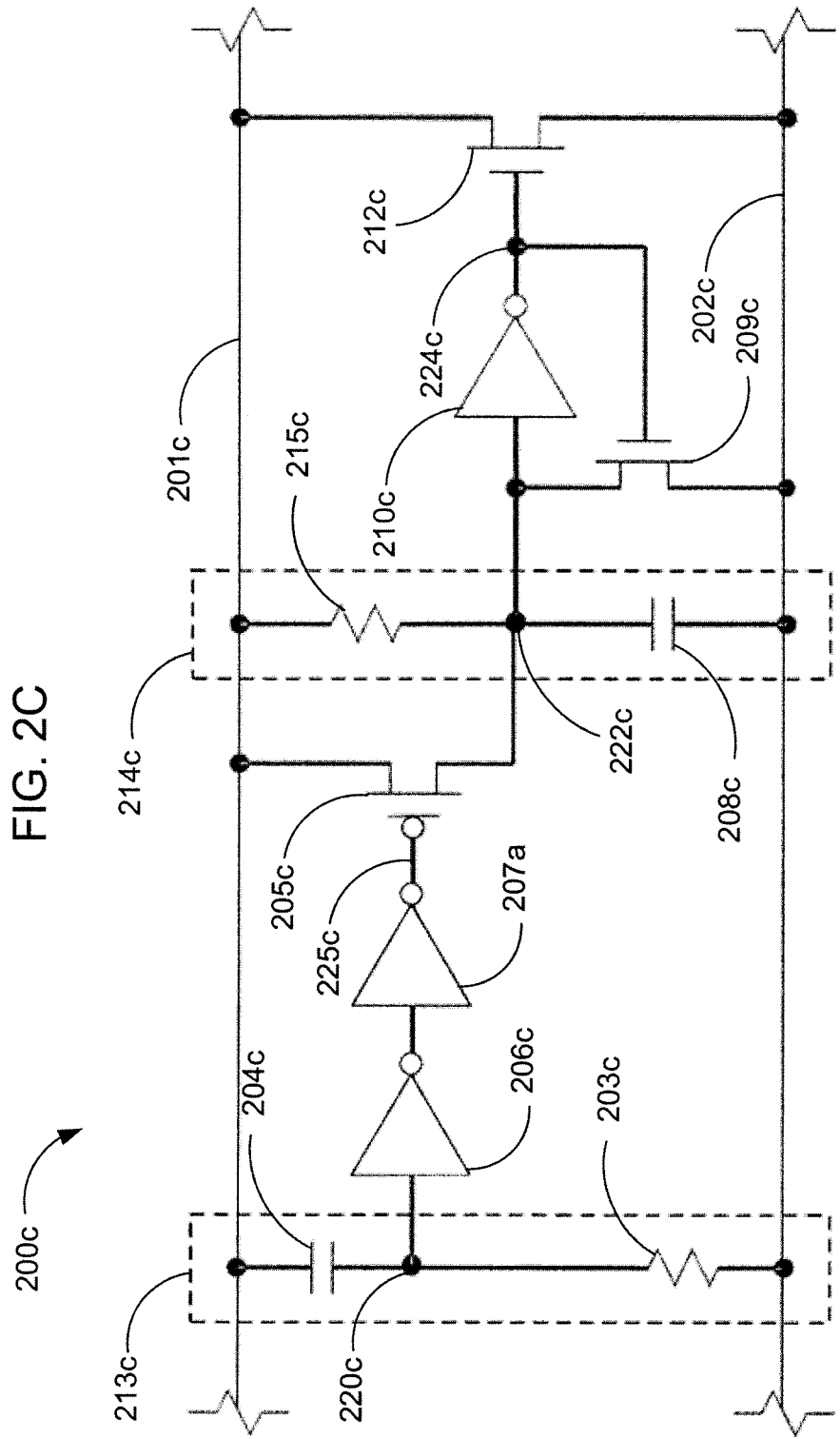

FIG. 2C illustrates another alternate embodiment of an ESD protection circuit 200c including two RC circuits 213c, 214c. In FIG. 2C, the position of resistor 203c and capacitor 204c are reversed in FIG. 2C with respect to resistor 215b and capacitor 208b in FIG. 2B. Further, the embodiment illustrated in FIG. 2C includes a PMOS transistor 205c connected to power rail 201c.

Figure 2H:
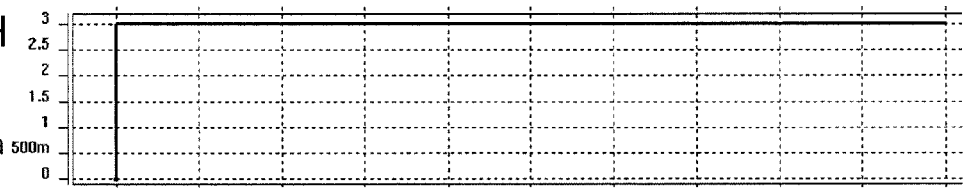
FIGS. 2H, 2I, 2J, 2K, 2L, and 2M illustrate the response of the ESD protection circuit of FIG. 2A in response to a power supply ramping to three volts in 50 ps.
Figure 2I:
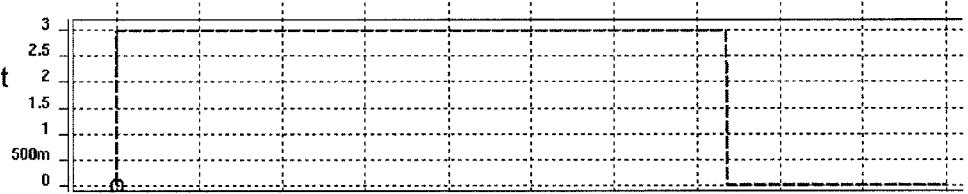
Figure 2J:
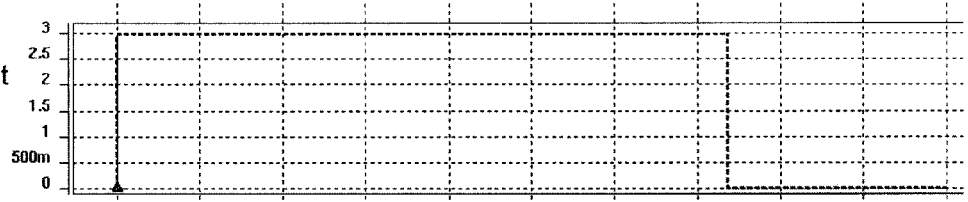
Figure 2K:
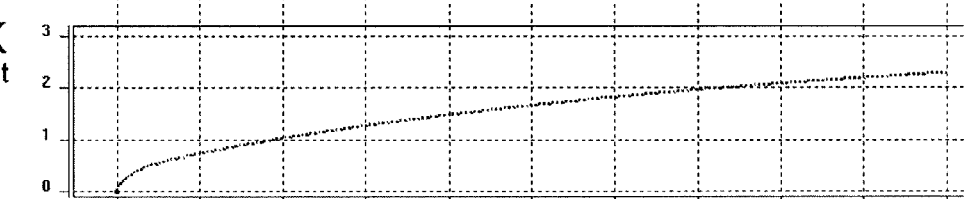
Figure 2L:
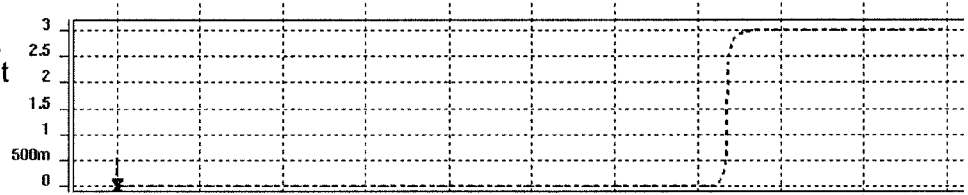
Figure 2M:
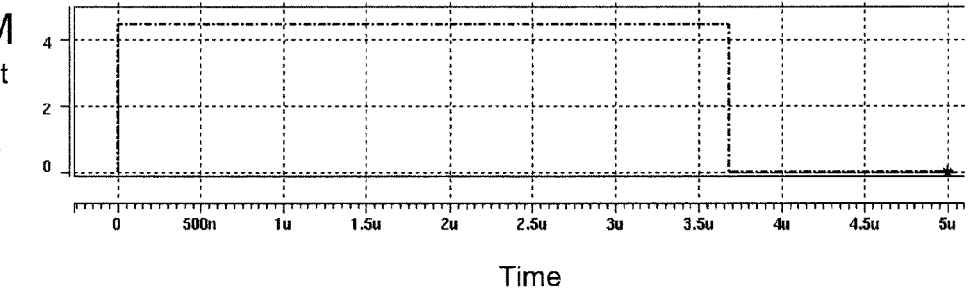
Figure 2N:
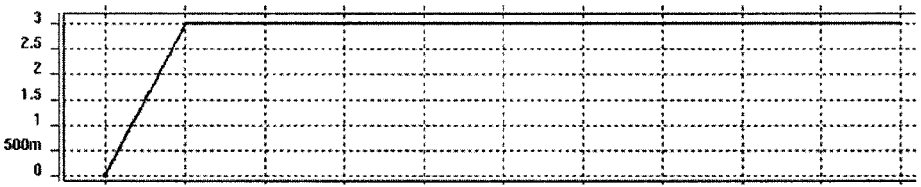
FIGS. 2N, 2O, 2P, 2Q, 2R, and 2S illustrate the response of the ESD protection circuit of FIG. 2A in response to a power supply ramping to three volts in 500 ns.
Figure 2O:
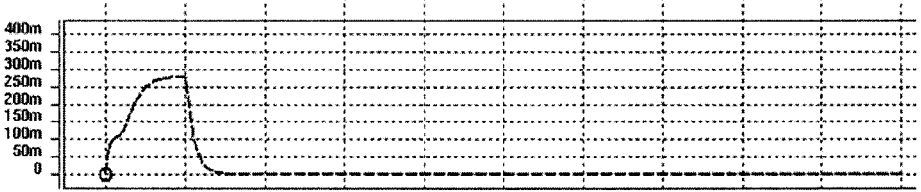
Figure 2P:
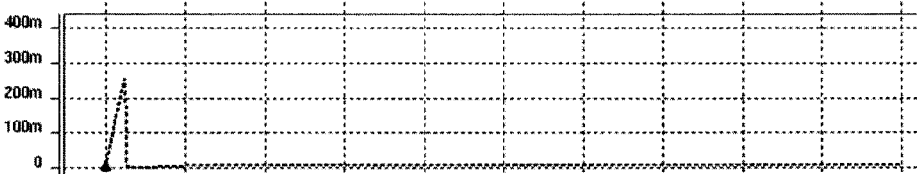
Figure 2Q:
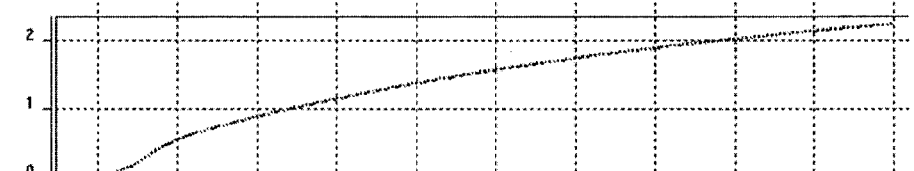
Figure 2R:
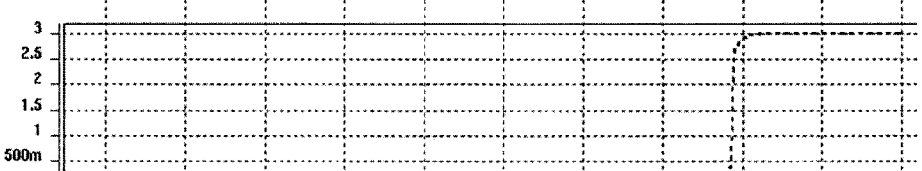
Figure 2S:
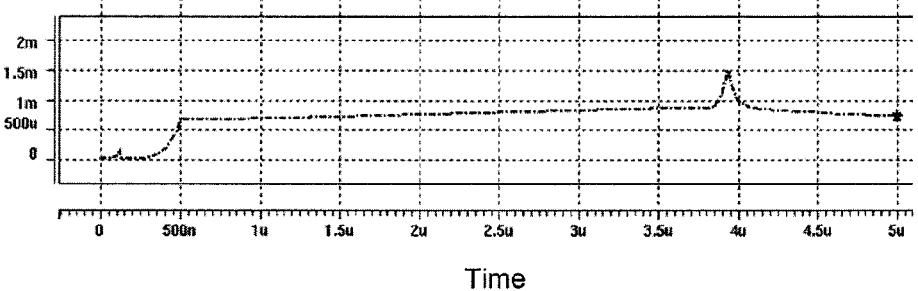

FIGS. 2D-2S illustrate simulation results of various scenarios in connection with ESD protection circuit 200a. The component values of the embodiment used in the simulations are set forth in Table 1. The measurements of the various transistors are given as the ratio in microns between channel width and length in the transistor. The simulations were run using 90 nanometer process technology. The component values set forth in Table 1 and the 90 nanometer process technology are merely exemplary of one embodiment selected from a wide range of possible component values and process technologies that may be utilized in accordance with the teachings of the present disclosure.

TABLE 1

| Resistor 203a | 1000 kΩ | Resistor 215a | 44 kΩ |
|---|---|---|---|
| Capacitor 204a (NMOS transistor) | 155.0/4.00 | Capacitor 208a (PMOS transistor) | 32.0/5.00 |
| Inverter 206a (NMOS transistor) | 0.8/0.50 | Inverter 210a (NMOS transistor) | 93.0/0.50 |
| Inverter 206a (PMOS transistor) | 12.0/0.40 | Inverter 210a (PMOS transistor) | 20.0/0.40 |
| Inverter 207a (NMOS transistor) | 5.0/0.50 | Inverter 211a (NMOS transistor) | 31.0/0.50 |
| Inverter 207a (PMOS transistor) | 10.0/0.40 | Inverter 211a (PMOS transistor) | 292.6/0.40 |
| Transistor 205a (NMOS transistor) | 18.0/0.50 | Transistor 212a (NMOS transistor) | 2232.0/0.13 |
| | | Transistor 209a (PMOS transistor) | 20.0/0.40 |

FIGS. 2D-2G illustrate the voltages at nodes 222a and 224a of ESD circuit 200a in response to a power supply having various ramp times. The line designated as ref. no. 230 corresponds to the voltage at node 222a, while the line designated as ref. no. 240 corresponds to the voltage at node 224a. The ramping power supply reaches 3 volts in the time indicated in each figure (i.e., 50 ps in FIG. 2D, 50 ns in FIG. 2E, 100 ns in FIG. 2F, and 150 ns in FIG. 2G). As illustrated in FIG. 2D, the ramping power supply causes the voltage at node 224 to become high, and thus causes transistor 212a to enter the active mode. In FIG. 2E, the high gate voltage lasts for a shorter period of time than the high voltage shown in FIG. 2D because of the slower ramp time of the power supply. In contrast, the 150 ns power supply ramp time shown in FIG. 2G, does not cause a high gate voltage at node 224a, and thus for a ramping signal of 150 ns, the transistor 212a does not enter the active mode. As illustrated in FIGS. 2D-2F, as the ramping time of the signal increases, the amount of time the voltage at node 224a is high decreases. As illustrated in FIG. 2G, ramping times exceeding a certain time do not cause the voltage at node 224a to become high.

FIGS. 2H-2M illustrate the response of ESD protection circuit 200a to a power supply that ramps to three volts in 50 ps. Such conditions are indicative of an ESD event. As illustrated in FIG. 2H, at time equal to zero, the voltage at power rail 201a begins to ramp up, and reaches three volts at 50 ps. FIG. 2I shows that in response to the voltage at power rail 201a, the voltage at node 222a also ramps up to three volts, since the voltage across capacitor 208a cannot change instantaneously. The high voltage at node 222a causes transistor 209a to enter the active mode. FIG. 2J illustrates that at node 224a (the gate of transistor 212a), the voltage is also equal to three volts, and thus causes transistor 212a to enter the active mode. FIG. 2K illustrates that as time passes, the voltage at node 220a begins to increase as charge is accumulated on capacitor 204a. As illustrated in FIG. 2L, once the voltage at node 220a exceeds the threshold voltage of inverters 206a and 207a, the voltage at node 225a switches. The switching occurs shortly after 3.5 microseconds. The high voltage at node 225a causes transistor 205a to enter the active mode. Once transistor 205a enters the active mode, the voltage at node 222a (shown in FIG. 2I) and the voltage at node 224a (shown in FIG. 2J) become low, thus causing transistor 212a to enter the cutoff mode. Referring to FIG. 2M, the current at power rail 201a is high until shortly after transistor 205a enters the active mode because transistor 212a is in the active mode, and is shunting current between the power rails 201a, 202a. Once transistor 212a enters the cutoff mode, the current flowing through power rail 201a decreases rapidly.

FIGS. 2N-2S illustrate the response of ESD protection circuit 200a to a power supply on power rail 201a that ramps to three volts in 500 ns. Such conditions may be typical of the ramp time of a hot plug device connected to a "hot" power source. As illustrated in FIG. 2N, at time equal to zero, the voltage at power rail 201a begins to ramp up, and reaches three volts at 500 ns. FIG. 2O shows that in response to the increasing voltage at power rail 201a, the voltage at node 222a increases slightly, but only reaches a peak value of less than 300 mV. The peak value of 300 mV is less than the threshold voltage of inverter 210a. Similarly, as illustrated in FIG. 2P, the voltage at node 224a initially rises, but quickly falls from its peak value of less than 300 mV. As capacitor 204a accumulates charge, the voltage at node 220a increases, as shown in FIG. 2Q. Eventually, the voltage at node 220a exceeds the threshold voltage of inverters 206a, 207a, and the voltage at node 225a switches, as illustrated in FIG. 2R. FIG. 2S shows that the current flowing through power rail 201a during this time remains relatively low, reaching a peak of only approximately 1.5 mA at the time that inverters 206a, 207a switch. As may be observed in comparing FIG. 1O to FIG. 2S, in response to the same power supply ramp time, the ESD protection circuit 200a is not activated, while the ESD protection circuit 100a was activated.

ESD events may be modeled in several ways. The teachings of the present disclosure may be applied to each of the various models. The human body model (HBM) and the charged device model (CDM) are commonly used for testing the susceptibility of electronic devices to ESD. The HBM simulates a discharge which might occur when a human who has accumulated an electrostatic charge touches an electronic device. The HBM approximates the charged human body as a capacitor in series with a resistor. The capacitor is charged to a specified high voltage from an external source. The capacitor is discharged through the resistor into the electronic device. According to the JEDEC 22-A114-B standard, the capacitor has a value of 100 picofarads and the resistor has a value of 1,500 ohms. The JEDEC 22-A114-B standard may result in an ESD event lasting between approximately 2 microseconds and 10 microseconds.

Under other models, or under real world conditions, a typical ramp time may be between 1 nanosecond and 30 nanoseconds. Accordingly, in certain embodiments, a time constant for RC circuit 214 may be selected such that a ramp time of less than 30 nanoseconds is recognized as an ESD event, as specified by the JEDEC 22-A114-B standard. Similarly, a time constant for RC circuit 213 may be selected such that transistor 212 remains in the active mode for a period of time sufficient to allow the ESD event to be completely dissipated (e.g., between approximately 2 and approximately 10 microseconds), as specified by the HBM.

The CDM is used to simulate a discharge which might occur when the electronic device has an accumulated electrostatic charge that is discharged when the electronic device comes into contact with another object at a different voltage. The CDM involves very little resistance, as it may be utilized to model metal-to-metal contact. Accordingly, the ramp time of the ESD event according to the CDM may be less than 400 picoseconds. In certain embodiments, a time constant for RC circuit 214 may be selected such that a ramp time of less than 400 picoseconds is recognized as an ESD event, as specified by the JEDEC 22-A114-B standard.

In certain embodiments, the time constant of RC circuit 214 is less than 200 nanoseconds. In another embodiment, the time constant of RC circuit 214 is less than 100 nanoseconds. In one embodiment, the time constant of RC circuit 213 is between 1.2 microseconds and 10 microseconds. In another embodiment, the time constant of RC circuit 213 is approximately 3.5 microseconds. It is contemplated that in other embodiments time constant values outside of the foregoing ranges may also be utilized.

Process variations vary depend on implementation technology, and may be taken into account in selecting a time constant for RC circuits 213a and 214a. For example, a 50 nanosecond nominal time constant may be expected to range from about 25 nanoseconds to about 100 nanoseconds due to process variations. Similarly, a 100 nanosecond nominal time constant may be expected to range between about 50 nanoseconds and about 200 nanoseconds.

As will be appreciated by one having skill in the art, various permutations discussed in connection with the ESD protection circuits 100, illustrated in FIGS. 1A-1G, may be similarly applied to the ESD protection circuit 200 illustrated in FIG. 2A. Depending on the process technology, various implementations may be employed. For example, a resistor may be implemented as an NFET, PFET, a poly-resistor, an infusion resistor, and the like. Embodiments according to the present disclosure may be implemented using discrete components, or may be part of an integrated circuit fabricated using a wide range of process technologies.

Figure 3:
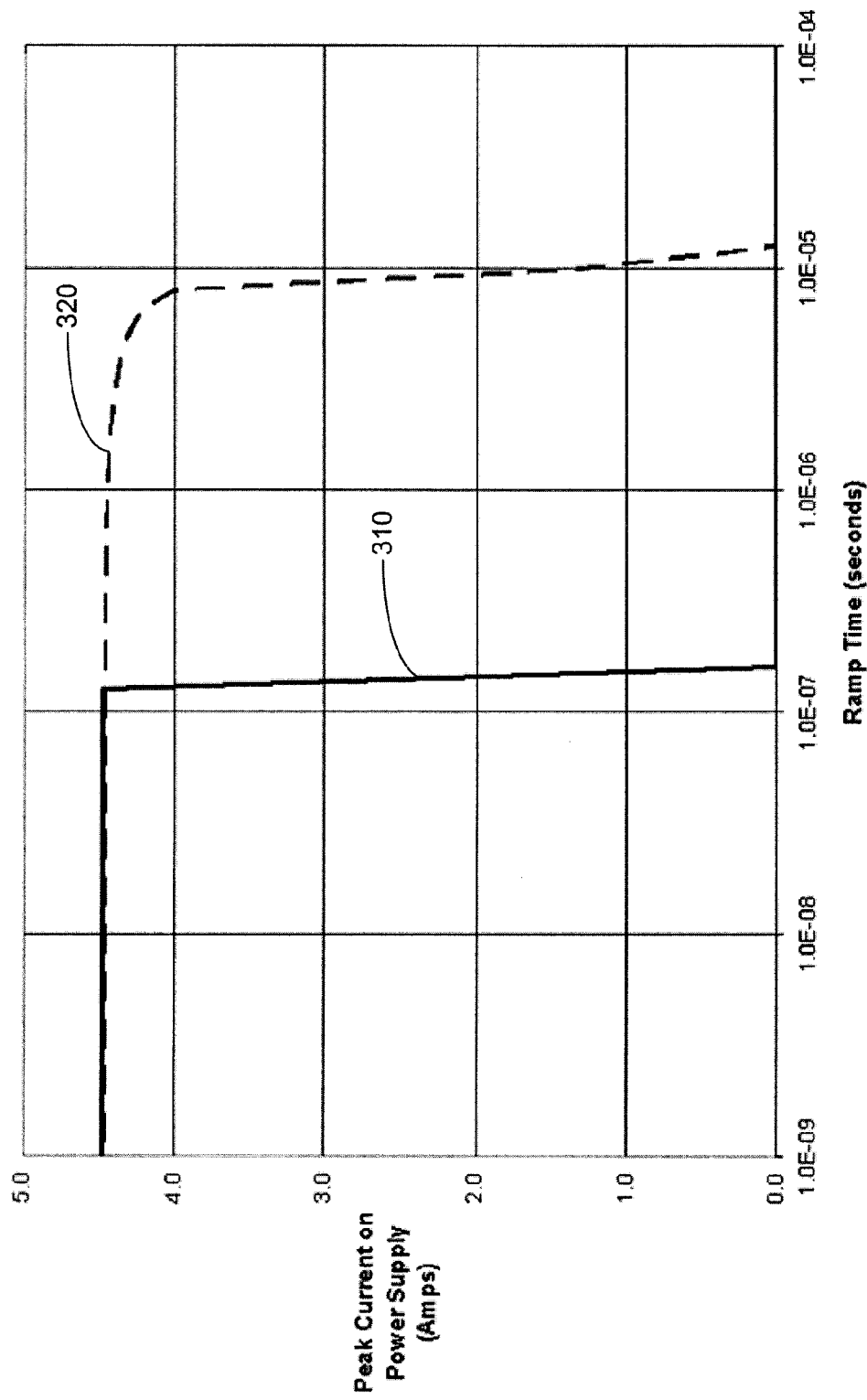
FIG. 3 is an illustration of the maximum current in comparison to the ramp time of a power supply in both a single RC circuit ESD protection circuit (as illustrated in FIG. 1A) and a dual RC circuit ESD protection circuit (as illustrated in FIG. 2A).

FIG. 3 is an illustration of the maximum current in comparison to the ramp time of a power supply in both a single RC circuit ESD protection circuit (as illustrated in FIG. 1A) and a dual RC circuit ESD protection circuit (as illustrated in FIG. 2A). The results of the single RC circuit ESD protection circuit are represented by the dashed line 320, while the results of the dual RC circuit ESD protection circuit are represented by the solid line 310. As illustrated, the maximum current in the dual RC circuit ESD protection circuit 310 drops rapidly for power supply ramp times that are more than 30 ns. Such performance may be desirable in certain applications, including hot plug devices, to ensure that a fast ramping power supply does not activate the ESD protection circuit. In alternative embodiments, an ESD protection circuit may be designed for a ramp time other than 30 ns by altering the RC time constant.

It will be obvious to those having skill in the art that many changes may be made to the details of the above-described embodiments without departing from the underlying principles of the present disclosure. The scope of the present invention should, therefore, be determined only by the following claims.

The invention claimed is:

1. A circuit for providing electrostatic discharge protection, the circuit comprising:
   a first power supply rail to receive a first voltage;
   a second power supply rail to receive a second voltage;
   a first series resistor-capacitor circuit coupled to the first power supply rail and the second power supply rail and configured to detect an electrostatic discharge event without detecting a fast ramping power supply as an electrostatic discharge event;
   a first transistor comprising a first terminal, a second terminal, and a gate, the first terminal of the first transistor coupled to the first power supply rail, the second terminal of the first transistor coupled to the second power supply rail, and the gate of the first transistor coupled to the first series resistor-capacitor circuit, wherein upon the detection of the electrostatic discharge event the first series resistor-capacitor circuit causes the first transistor to enter an active mode and shunt a first current from the first power supply rail to the second power supply rail;
   a third transistor comprising a first terminal, a second terminal, and a gate, the first terminal of the third transistor coupled to the first power supply rail, the second terminal of the third transistor coupled to the first series resistor-capacitor circuit, and the gate of the third transistor coupled to the gate of the first transistor, wherein the third transistor is configured to maintain the first transistor in the active mode by passing a third current to the first series resistor-capacitor circuit that prevents the first series resistor-capacitor circuit from discharging; and
   a second series resistor-capacitor circuit coupled to the first power supply rail and the second power supply rail and configured to cause the first transistor to enter a cutoff mode at the end of a discharge period following the electrostatic discharge event.

2. The circuit of claim 1, further comprising a second transistor comprising a first terminal, a second terminal, and a gate, the first terminal of the second transistor coupled to the gate of the first transistor, the second terminal of the second transistor coupled to the second power supply rail, and the gate of the second transistor coupled to the second series resistor-capacitor circuit, such that the second transistor enters a cutoff mode in response to the ESD event, and enters an active mode after the discharge period.

3. The circuit of claim 2, wherein the second transistor is configured to pass a second current larger than the third current when the second and third transistors are both active.

4. The circuit of claim 2, further comprising a first buffer coupled between the second series resistor-capacitor circuit and the gate of the second transistor.

5. The circuit of claim 4, wherein the first buffer comprises a first inverter and a second inverter connected in series.

6. The circuit of claim 1, further comprising:
   a second buffer comprising an input and an output, wherein the second terminal of the third transistor is further coupled to the input of the second buffer, and the gate of the third transistor is further coupled to the output of the second buffer.

7. The circuit of claim 6, further comprising a third buffer coupled between the output of the second buffer and the gate of the first transistor.

8. The circuit of claim 1, wherein the first series resistor-capacitor circuit has a time constant of less than 200 nanoseconds.

9. The circuit of claim 1, wherein the first series resistor-capacitor circuit has a time constant of less than 100 nanoseconds.

10. The circuit of claim 1, wherein the first series resistor-capacitor circuit has a time constant of less than 30 nanoseconds.

11. The circuit of claim 1, wherein the second series resistor-capacitor circuit has a time constant between approximately 1.2 microseconds and 10 microseconds.

12. The circuit of claim 1, wherein the second series resistor-capacitor circuit has a time constant of approximately 3.5 microseconds.

13. The circuit of claim 1, wherein the first transistor is a BIGFET.

14. The circuit of claim 1, wherein the time constant of the second series resistor-capacitor circuit exceeds the time constant of the first series resistor-capacitor circuit.

15. The circuit of claim 1, wherein a capacitor of the first series resistor-capacitor circuit is charged to a voltage approximately equal to the difference between the first voltage and the second voltage in a steady-state condition.

16. The circuit of claim 1, further comprising a second transistor comprising a first terminal, a second terminal, and a gate, the first terminal of the second transistor coupled to the first power supply rail, the second terminal of the second transistor coupled to the gate of the first transistor, and the gate of the second transistor coupled to the second series resistor-capacitor circuit, such that the second transistor enters a cutoff mode in response to the ESD event, and enters an active mode after the discharge period.

17. A method for providing electrostatic discharge protection in a circuit, the method comprising:
distinguishing an electrostatic discharge event between a first power supply rail and a second power supply rail from a fast ramping power supply using a first series resistor-capacitor circuit coupled to the first power supply rail and the second power supply rail;
shunting current through a first transistor coupled to the first series resistor-capacitor circuit, the first power supply rail, and the second power supply rail upon the detection of the electrostatic discharge event;
maintaining the current shunt between the first power supply rail and the second power supply rail for a discharge period after the electrostatic discharge event by preventing the first series resistor-capacitor circuit from discharging; and
placing the first transistor in cutoff mode using a second series resistor-capacitor circuit coupled to the first transistor, the first power supply rail, and the second power supply rail, wherein minimal current flows through the first transistor while it is in the cutoff mode.

18. A circuit for providing electrostatic discharge protection, the circuit comprising:
a first series resistor-capacitor circuit configured to detect an electrostatic discharge event without detecting a fast ramping power supply as an electrostatic discharge event;
a first transistor having a gate coupled to the first series resistor-capacitor circuit, such that upon the detection of the electrostatic discharge event the first transistor enters an active mode; and
a third transistor configured to maintain the first transistor in the active mode for a discharge period after the electrostatic discharge event by preventing the first series resistor-capacitor circuit from discharging; and
a second series resistor-capacitor circuit configured to cause the first transistor to enter a cutoff mode after the discharge period, wherein minimal current flows through the first transistor while it is in the cutoff mode.

19. The circuit of claim 18, further comprising a second transistor having a gate coupled to the second series resistor-capacitor circuit, such that the second transistor enters a cutoff mode in response to the ESD event, and enters an active mode after the discharge period.

20. The circuit of claim 19, wherein the second transistor is in an active mode when the circuit is in a steady-state condition.

21. The circuit of claim 19, further comprising a first buffer coupled between the second series resistor-capacitor circuit and the gate of the second transistor.

22. The circuit of claim 21, wherein the first buffer comprises a first inverter and a second inverter connected in series.

23. The circuit of claim 18, further comprising:
a second buffer comprising an input and an output,
wherein the third transistor includes a terminal coupled to the first series resistor-capacitor circuit and a gate coupled to the output of the second buffer and the gate of the first transistor.

24. The circuit of claim 23, further comprising a third buffer coupled between the output of the second buffer and the gate of the first transistor.

25. The circuit of claim 18, wherein the first series resistor-capacitor circuit has a time constant of less than 200 nanoseconds.

26. The circuit of claim 18, wherein the first series resistor-capacitor circuit has a time constant of less than 100 nanoseconds.

27. The circuit of claim 18, wherein the first series resistor-capacitor circuit has a time constant of less than 30 nanoseconds.

28. The circuit of claim 18, wherein the second series resistor-capacitor circuit has a time constant between 1.2 microseconds and 10 microseconds.

29. The circuit of claim 18, wherein the second series resistor-capacitor circuit has a time constant of approximately 3.5 microseconds.

30. The circuit of claim 18, wherein the first transistor is a BIGFET.

31. The circuit of claim 18, wherein the time constant of the second series resistor-capacitor circuit exceeds the time constant of the first series resistor-capacitor circuit.

* * * * *